United States Patent
Zhu et al.

(10) Patent No.: US 11,400,955 B2
(45) Date of Patent: Aug. 2, 2022

(54) MULTI-POINT ENFORCED BASED STITCH METHOD TO CONNECT TWO SMOOTHED REFERENCE LINES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Xin Xu, Beijing (CN); Jingao Wang, Sunnyvale, CA (US)

(73) Assignees: BAIDU USA LLC, Sunnyvale, CA (US); BAIDU.COM TIMES TECHNOLOGY (BEIJING) CO. LTD., Beijing (CN)

( * ) Notice: Subject to any disclaimer, the term of this patent is extended or adjusted under 35 U.S.C. 154(b) by 369 days.

(21) Appl. No.: 16/338,461

(22) PCT Filed: Mar. 29, 2019

(86) PCT No.: PCT/CN2019/080414
§ 371 (c)(1),
(2) Date: Mar. 30, 2019

(87) PCT Pub. No.: WO2020/198938
PCT Pub. Date: Oct. 8, 2020

(65) Prior Publication Data
US 2021/0188309 A1  Jun. 24, 2021

(51) Int. Cl.
*B60W 60/00* (2020.01)
*G01C 21/00* (2006.01)
(Continued)

(52) U.S. Cl.
CPC ........ *B60W 60/001* (2020.02); *B60W 40/072* (2013.01); *G01C 21/3407* (2013.01); *G01C 21/38* (2020.08)

(58) Field of Classification Search
CPC ... B60W 60/001; B60W 40/072; G01C 21/38; G01C 21/3407
See application file for complete search history.

(56) References Cited

U.S. PATENT DOCUMENTS 6,134,486 A * 10/2000 Kanayama ........... G05D 1/0212
701/23
9,816,822 B1 * 11/2017 Lalonde ................ G01C 21/30
(Continued)

*Primary Examiner* — Sze-Hon Kong
*Assistant Examiner* — Mikko Okechukwu Obioha
(74) *Attorney, Agent, or Firm* — Womble Bond Dickinson (US) LLP

(57) ABSTRACT

In one embodiment, a method for generating a reference line for operating an autonomous driving vehicle includes determining a first ending reference point having a smallest curvature among a plurality of points within a first defined distance along a path, generating a first reference line based on a first initial reference point and the first ending reference point, determining a second ending reference point having a smallest curvature among a plurality of points within a second defined distance along the path, generating a second reference line based on the first and second ending reference points and an end section of the first reference line, connecting the first and second reference lines, and controlling the autonomous driving vehicle along the connected first reference line and the second reference line.

21 Claims, 7 Drawing Sheets

(51) Int. Cl.
 *B60W 40/072* (2012.01)
 *G01C 21/34* (2006.01)

(56) References Cited

U.S. PATENT DOCUMENTS

2019/0308621 A1* 10/2019 Inou .......................... G08G 1/09
2020/0282987 A1*  9/2020 Zhu .................... B60W 60/0011
2020/0310451 A1* 10/2020 Zhu ....................... B60W 10/04

* cited by examiner

I

MULTI-POINT ENFORCED BASED STITCH METHOD TO CONNECT TWO SMOOTHED REFERENCE LINES

CROSS-REFERENCE TO RELATED APPLICATION

This patent application is a U.S. National Phase Application under 35 U.S.C. § 371 of International Application No. PCT/CN2019/080414, filed Mar. 29, 2019, entitled "MULTI-POINT ENFORCED BASED STITCH METHOD TO CONNECT TWO SMOOTHED REFERENCE LINES," which is incorporated by reference herein by its entirety.

TECHNICAL FIELD

Embodiments of the present disclosure relate generally to operating autonomous vehicles. More particularly, embodiments of the disclosure relate to generating references lines for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Typically, an autonomous driving vehicle (ADV) is controlled and driven according to a reference line. When generating a driving trajectory, the system heavily relies on the reference line. The reference line is a smooth line on the map. The vehicle tries to drive by following the reference line. Roads and lanes on the map are often represented by a list of connected line segments, which are not smooth and difficult for the ADV to follow. As a result, a smooth optimization is performed on the reference line to smooth the reference line. However, such optimization may not necessarily yield a smooth reference line.

It's necessary to generate a smooth reference line, especially when the ADV is traveling at a high speed. While the reference line length/time required is usually not linear but exponential, the reference line needs to be smoothed separately and stitched together. However, in many smoothing algorithms (e.g., Quadratic Programming or QP), limiting its high level derivative (e.g., curvature and curvature derivative) is difficult, and makes the stitch point between two reference lines discontinuous especially when there is a large gap between two adjacent curvatures that need to be joined.

SUMMARY

In an aspect of the disclosure, a computer-implemented method for generating a reference line for operating an autonomous driving vehicle is provided. The method includes: determining a first ending reference point having a smallest curvature among a plurality of reference points within a first defined distance along a first segment of a path; generating a first reference line based on a first initial reference point and the first ending reference point; determining a second ending reference point having a smallest curvature among a plurality of reference points within a second defined distance along a second segment the path; generating a second reference line based on the first and second ending reference points and an end section of the first reference line; and controlling the autonomous driving vehicle along the first reference line and the second reference line.

In another aspect of the disclosure, a non-transitory machine-readable medium having instructions stored therein is provided. The stored instructions, when executed by a processor, cause the processor to perform operations, the operations including: determining a first ending reference point having a smallest curvature among a plurality of reference points within a first defined distance along a first segment of a path; generating a first reference line based on a first initial reference point and the first ending reference point; determining a second ending reference point having a smallest curvature among a plurality of reference points within a second defined distance along a second segment the path; generating a second reference line based on the first and second ending reference points and an end section of the first reference line; and controlling the autonomous driving vehicle along the first reference line and the second reference line.

In another aspect of the disclosure, a data processing system is provided. The system includes a processor and a memory coupled to the processor to store instructions, which when executed by the processor, cause the processor to perform operations, the operations including: determining a first ending reference point having a smallest curvature among a plurality of reference points within a first defined distance along a first segment of a path; generating a first reference line based on a first initial reference point and the first ending reference point; determining a second ending reference point having a smallest curvature among a plurality of reference points within a second defined distance along a second segment the path; generating a second reference line based on the first and second ending reference points and an end section of the first reference line; and controlling the autonomous driving vehicle along the first reference line and the second reference line.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an autonomous driving vehicle (also known as "autonomous vehicle") includes a decision and planning system for generating a reference line for operating an autonomous driving vehicle. The system performs operations including determining a first ending reference point having a smallest curvature among a plurality of points within a first defined distance along a first segment or section of a path, generating a first reference line based on a first initial reference point and the first ending reference point, and determining a second ending reference point having a smallest curvature among a plurality of points within a second defined distance along a second segment or section of the path. The operations further include generating a second reference line based on the first and second ending reference points and an end section of the first reference line, connecting the first and second reference lines, and controlling the autonomous driving vehicle along the connected first reference line and the second reference line.

Figure 1:
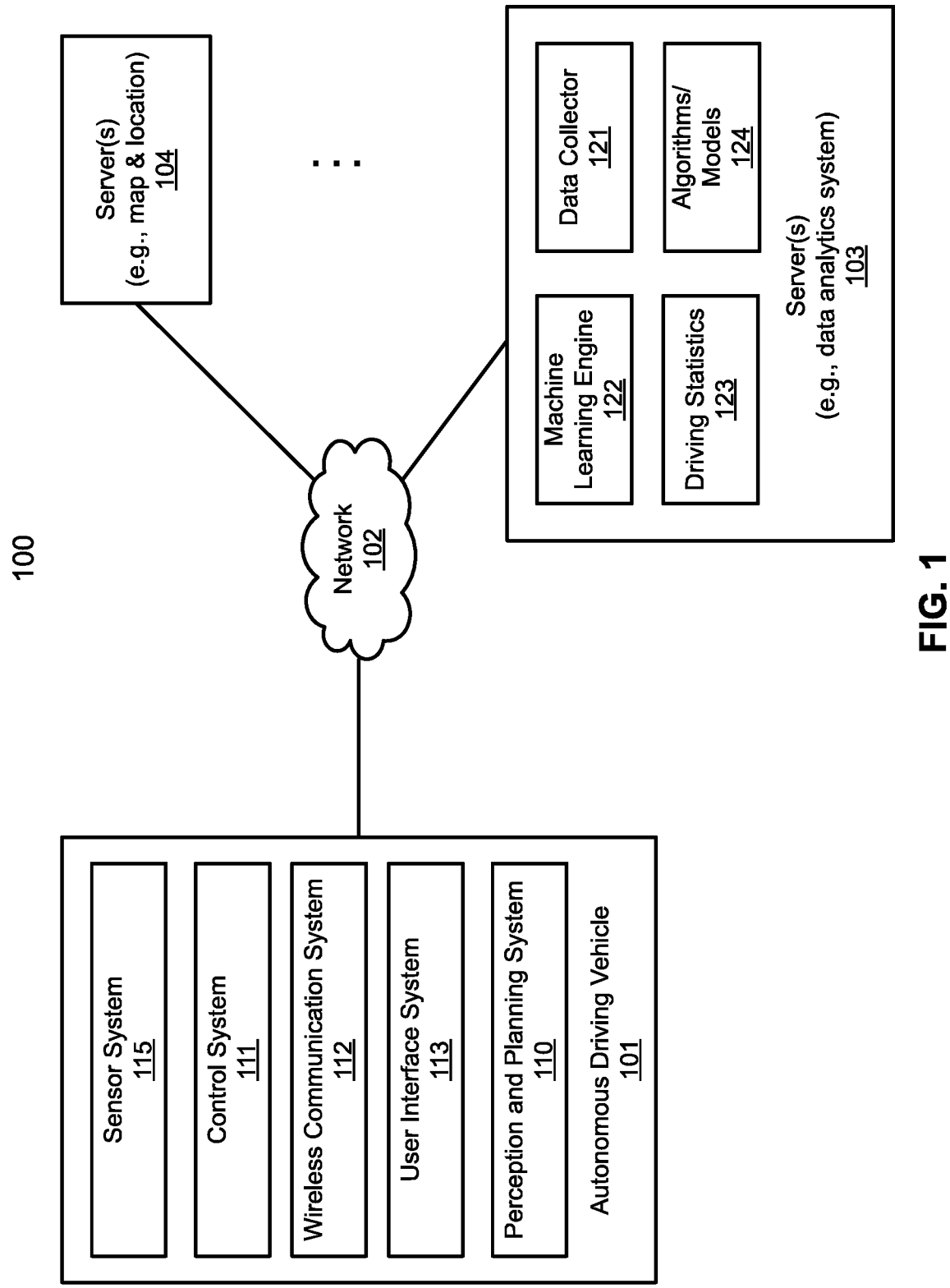
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous driving vehicle (ADV) 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
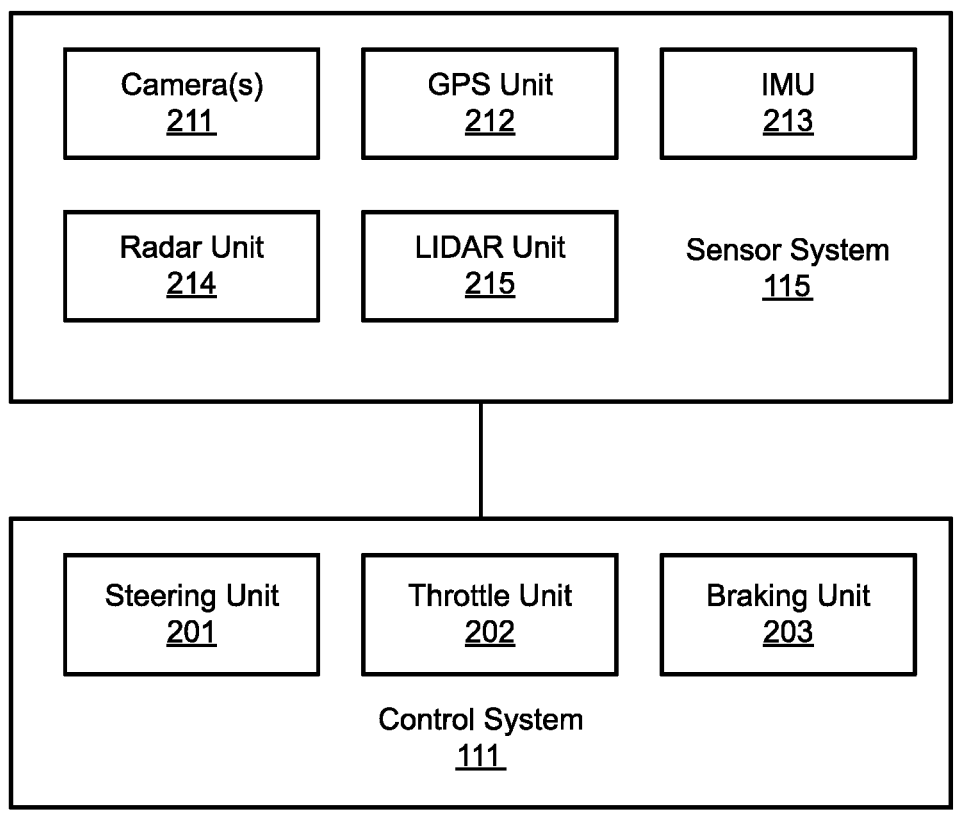
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include an algorithm or model to generate a smooth reference line. Algorithms 124 can then be uploaded on ADVs to be utilized during autonomous driving in real-time.

Figure 3A:
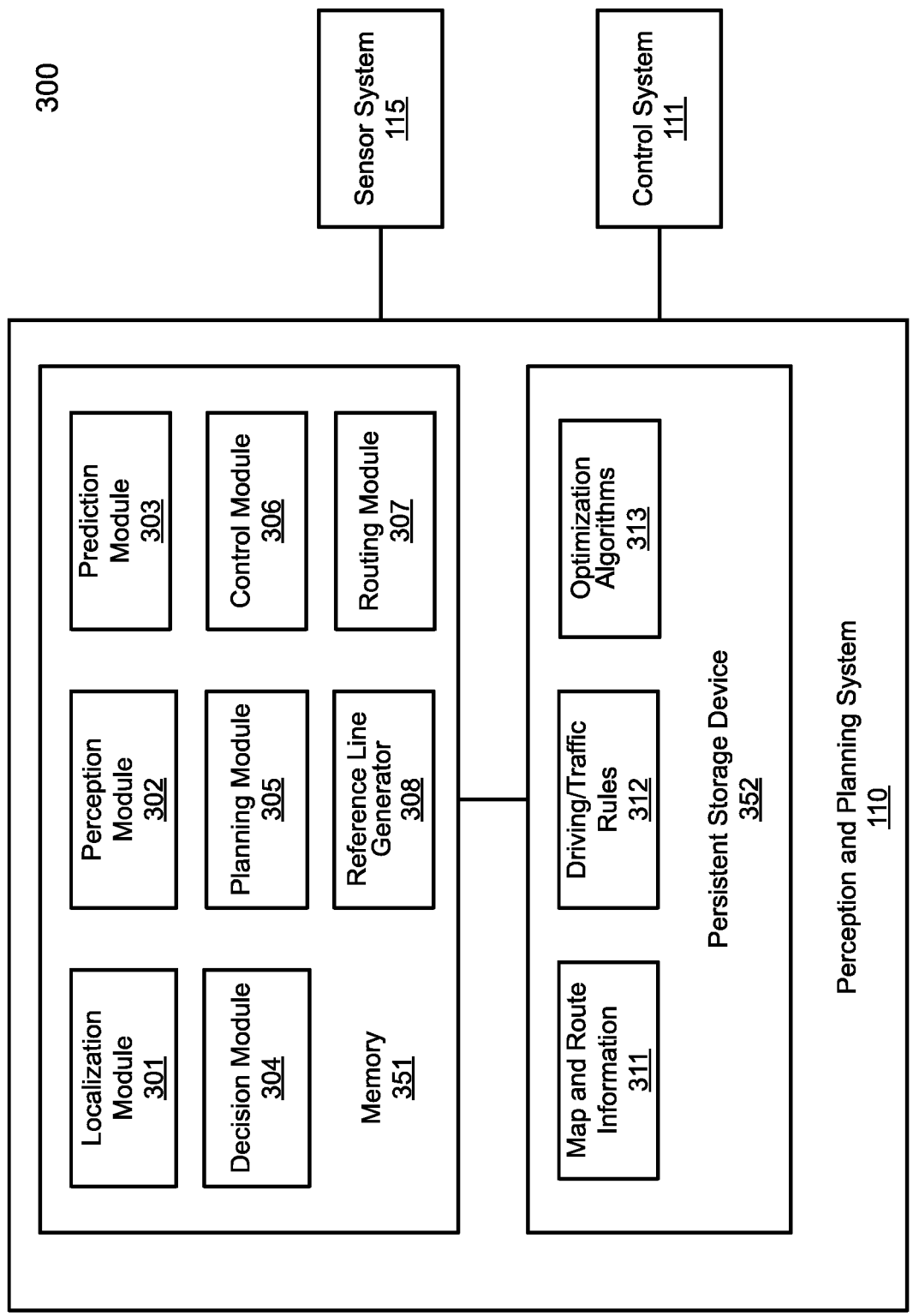
FIGS. 3A-3B are block diagrams illustrating an example of a perception and planning system used with an autonomous vehicle according to one embodiment.
Figure 3B:
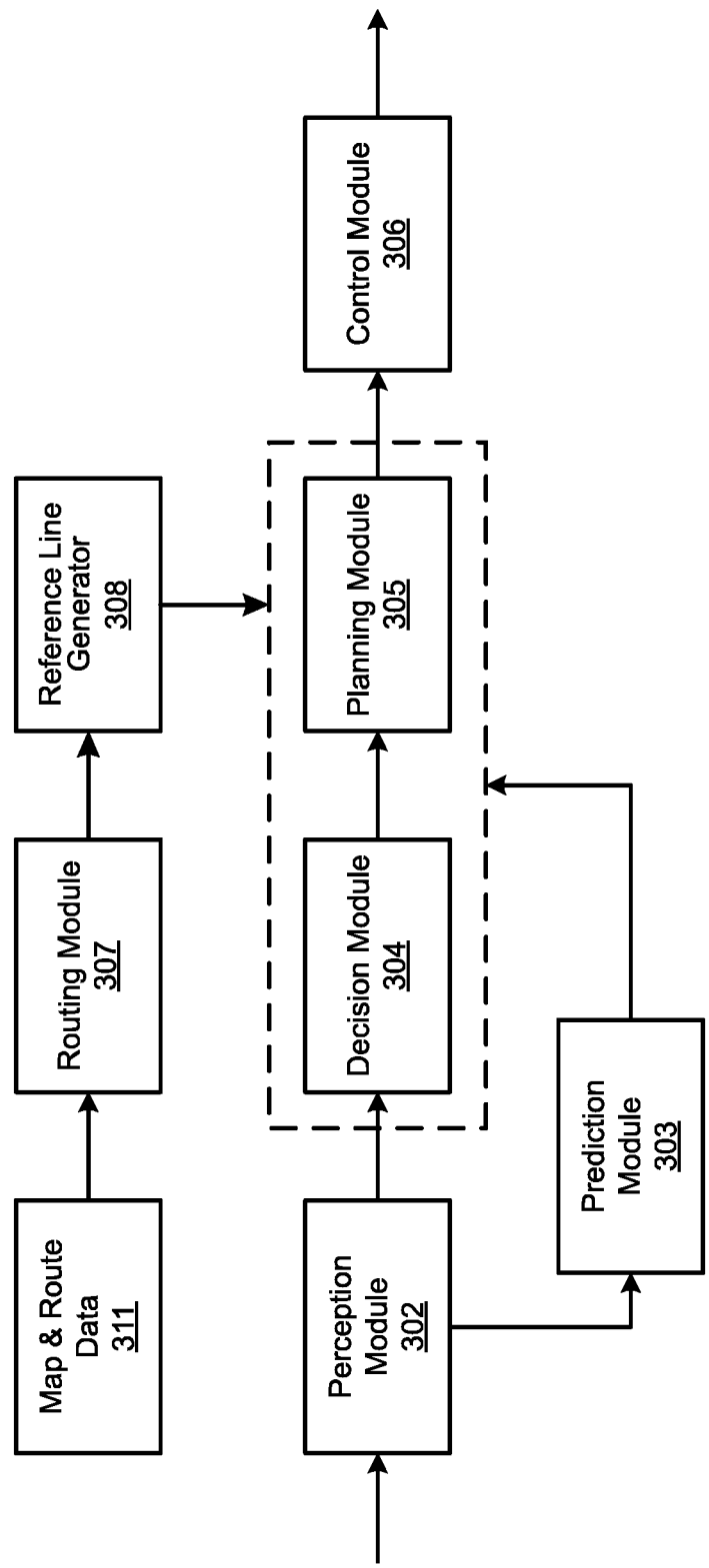

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and reference line generator 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn, respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 or reference line generator 308 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Continuing with FIGS. 3A and 3B, reference line generator 308 generates one or more reference lines for operating an ADV. Note that reference line generator 308 may be integrated with routing module 307, planning module 305, or a separate module. According to one embodiment, when an initial reference line has been determined and received from routing module 307, reference line generator 308 is configured to generate a first reference line. Typically, the initial reference line was created based on the route and map information. A road is typically represented by a sequence of road segments. An initial reference line is typically the center line of each road segment. As a result, the initial reference line is a collection of center line segments connected to each other and such an initial reference line is not smooth, particularly at the joint of two adjacent segments. Based on the initial reference line, reference line generator 308 performs an optimization on the initial reference line to generate a smooth reference line.

In one embodiment, reference line generator 308 performs a spline optimization on the selected control points of the initial reference line. A spline is a curve represented by one or more (e.g., piecewise) polynomials joined together to form the curve. For example, a polynomial or a polynomial function can represent a segment between adjacent control points. Each control point is associated with a set of constraints, which include initial constraints, equality constraints, and inequality constraints.

The initial constraints include a set of constraints corresponding to the ADV's initial condition, e.g., ADV's immediate direction and/or geographical location. Equality constraints include a set of equality constraints asserting some equality conditions that must be satisfied. For example, the equality constraints can include a set of constraints that guarantee joint smoothness and/or some pointwise constraints are satisfied (e.g., the spline will pass some points or have some specific point heading). The inequality constraints include a set of constraints that guarantee the spline is within some boundary (e.g., less than or greater than some constraint value). Both inequality and equality constraints are hard constraints, meaning that it is required that they are satisfied. The resulting reference line will be smooth.

According to one embodiment, an initial reference line can be generated using dynamic programming (DP) techniques. Such a reference line may be referred to as a rough reference line, which is not smooth. Dynamic programming (or dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution. Once the initial or rough reference line has been generated, the initial reference line may be smoothed by an optimization process. In one embodiment, the reference line smooth optimization is performed using quadratic programming techniques. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once.

The term of polynomial optimization or polynomial fit refers to the optimization of the shape of a curve (in this example, a trajectory) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous. However, the above optimization operations may not yield a smooth reference line when the two reference lines are connected or stitched together, especially when the ADV is traveling at high speeds which may result in abrupt turns/movements noticeable to the passengers in the ADV.

Figure 4:
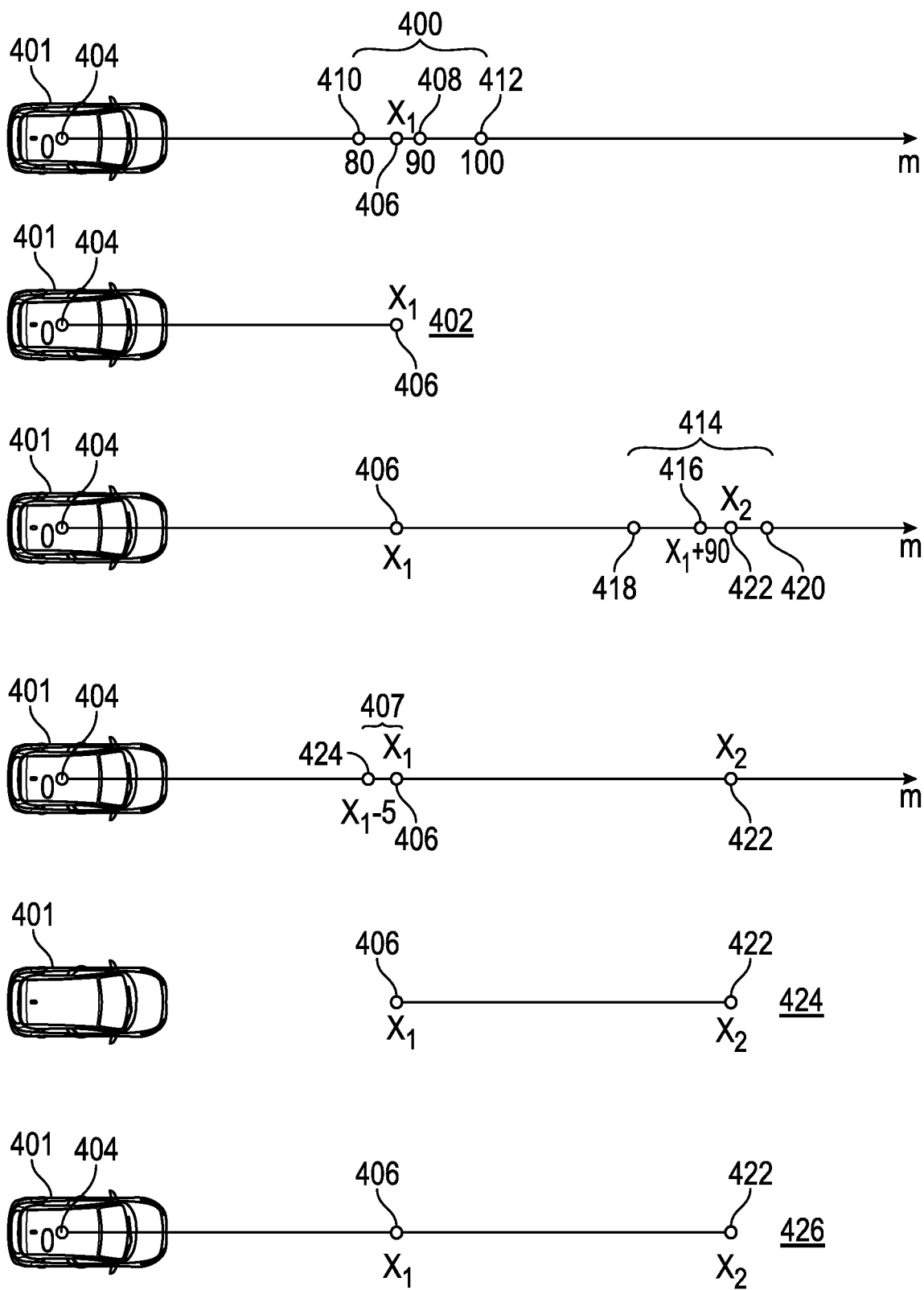
FIG. 4 is a diagram illustrating a process of generating and connecting reference lines according to one embodiment.

With reference to FIG. 4, an ADV 401 is traveling along a trajectory generated from a first reference line 402 (also referred to as a first reference line segment) which includes a beginning reference point 404 and an ending reference point 406.

The above described process is then repeated for successive reference lines, one for each planning cycle, such that the ADV 402 continues to travel along the path using the references lines now connected together and smoothed using the algorithms/optimizations described above in order to reach its destination location.

FIG. 4 is a diagram illustrating a process of generating and connecting reference lines according to one embodiment of the present disclosure. In a first operation, an autonomous driving vehicle 401, via its perception and planning system 110 (e.g. via reference line generator 308), obtains from a map a line segment representing a road or path and the line segment may be an initial length of an initial reference line (for example, 90 meters (m) long) beginning with an initial reference point 404 and terminating at a reference point 408. The perception and planning system 110 then checks the curvatures of the points from the map within a first specified distance 400 along the path. In one embodiment, the first specified distance 400 may be determined by subtracting a defined distance (for example, about 10 meters) from the initial length (e.g., 90 meters) of the initial reference line and adding the defined distance to the initial length of the initial reference line. In one embodiment, the defined distance is about 10 percent of the initial length of the initial reference line. In one embodiment, the first specified distance 400 may be from 80 meters (e.g., subtracting 10 m from the initial length, i.e., 90−10 meters) represented by point 410 to 100 meters (e.g., adding 10 m to the initial length, i.e., 90+10 meters) represented by point 412. A plurality of points are within the first specified distance 400, only four (406, 408, 410, 412) of which are shown in FIG. 4 for the sake of simplicity. Any suitable number of points may be within or included in the first specified distance 400.

Figure 5:
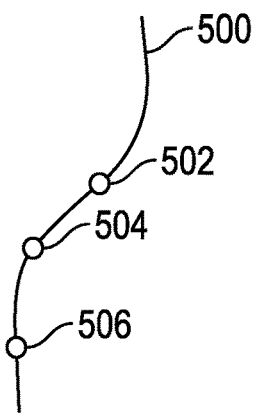
FIG. 5 illustrates a curved path having points along the path with example curvatures.

The perception and planning system 110 (e.g., a map (e.g., map and route information module 311) and localization module (e.g., localization module 301) in combination with a planning module (e.g., planning module 305)) determines a point (for example, a point 406 ($X_1$)) having the smallest or minimal curvature among the plurality of points (406, 408, 410, 412) within the first specified distance 400 and this point 406 serves as a first ending reference point 406 for a first reference line. In one embodiment, the curvature of each of the points within the first specified distance 400 is checked to determine the first ending reference point 406 having the smallest curvature. A point having the smallest curvature among the plurality of points may be determined from the map as shown in FIG. 5 and described in more detail below. A suitable smoothing algorithm/optimization, such as a quadratic programming (QP) algorithm/optimization as described above, may be used to generate a smooth reference line such as a smooth first reference line 402 [0 m, $X_1$] based on the first initial reference point 404 and the first ending reference point 406 ($X_1$). The first reference line 402 is generated based on regular constraints for each evaluated point which limits the freedom of (smoothed point—original point) to 0.3 m in both the x and y axis. For example, the difference between the smoothed point and the original point is ≤0.3 m. The original point may be obtained from the map. In a second operation, the smoothed results from the QP algorithm may be stored in discrete form, for example, 0.1 m per point.

Continuing with the process shown in FIG. 4, in a third operation, the perception and planning system 110 checks the curvatures of the points, from the map, within a second specified distance 414 along the path. In one embodiment, the second specified distance 414 may be determined as in the first operation described above by subtracting and adding the defined distance (e.g., 10 meters) from and to an initial length of an initial reference line where the initial length is, for example, $X_1$+90 meters denoted by point 416. In one embodiment, the second specified distance 414 may be from $X_1$+90-10 meters (subtracting as described above) represented by point 418 to $X_1$+90+10 meters (adding as described above) represented by point 420 using point 416 ($X_1$+90 meters) as an initial length of a reference line. A plurality of points are within the second specified distance 414, only four (416, 418, 420, 422) of which are shown in FIG. 4, again for the sake of simplicity. Any suitable number of points may be within the second specified distance 414.

The perception and planning system 110 (e.g., a map (e.g., map and route information module 311) and localization module (e.g., localization module 301) in combination with a planning module (e.g., planning module 305)) determines a point (for example, a point 422 ($X_2$)) having the smallest curvature among the plurality of points (416, 418, 420, 422) within the second specified distance 414 and this point 422 serves as a second ending reference point 422. Input points from the original line from the map are obtained for a second reference line. In a fourth operation, the end section 407 (e.g., the last 5 meters of the first reference line 402) from the first smoothed results [$X_1$-5, $X_1$] together with [$X_1$, $X_2$] are inputted to a second QP algorithm to generate a smooth reference line such as a smooth second reference line 424.

By using the end section 407 of the first reference line 402 in generating the second reference line 424, the second reference line 424 can follow the same pattern of the first reference line 402 thereby ensuring that the two reference lines can be smoothly connected. In one embodiment, the end section 407 of the first reference line 402 is less than 10 percent of a length of the first reference line 407. The second reference line 424 [$X_1$, $X_2$] is generated by the perception and planning system 110 based on the first 406 and second 422 ending reference points and an end section 407 of the first reference line 402 using suitable constraints.

In one embodiment, for the points within the end section 407 of the first reference line 402, a first set of constraints such as strict constraints/limits is used where (smoothed point-original point) limit is 0.01 m in the x, y axis and the heading is set to the range of original heading +/−0.001 radians. The original heading is obtained from the smoothed results from the first QP smoothing algorithm. With a 0.1 meter resolution, there will be approximately 50 points with the strict limit. For points within the second reference line 424 [$X_1$, $X_2$], a second set of constraints such as regular constraints/limits is used where (smoothed point—original point) limit is 0.3 meters in the x, y axis and the heading is set to the range of the original heading +/−0.01 radians. The original heading is obtained from the map. In one embodiment, the second set of constraints is less stringent than the first set of constraints.

The perception and planning system 110 then connects or stitches the first 402 [0, $X_1$] and second 424 [$X_1$, $X_2$] reference lines outputted by the QP algorithms described above. A smooth connection of the first and second reference lines is achieved due to the use of the end section 407 in the smooth optimization of the second reference line. The end section 407 [$X_1$-5, $X_1$] smoothed results from the second QP algorithm are discarded. As shown in FIG. 4, the autonomous driving vehicle 401 is controlled along the connected first and second reference lines 426.

FIG. 5 illustrates a curved path 500 having points along the curved path with example curvatures. For example, the curved path 500 representing a curved road, includes example reference points such as a reference point 502 at 100 meters, a reference point 504 at 90 meters, and a reference point 506 at 80 meters. As can be seen in FIG. 5, reference point 506 at 80 meters has the smallest curvature among the example reference points and therefore, reference point 506 can serve as an ending reference point for a reference line as described above.

Figure 6:
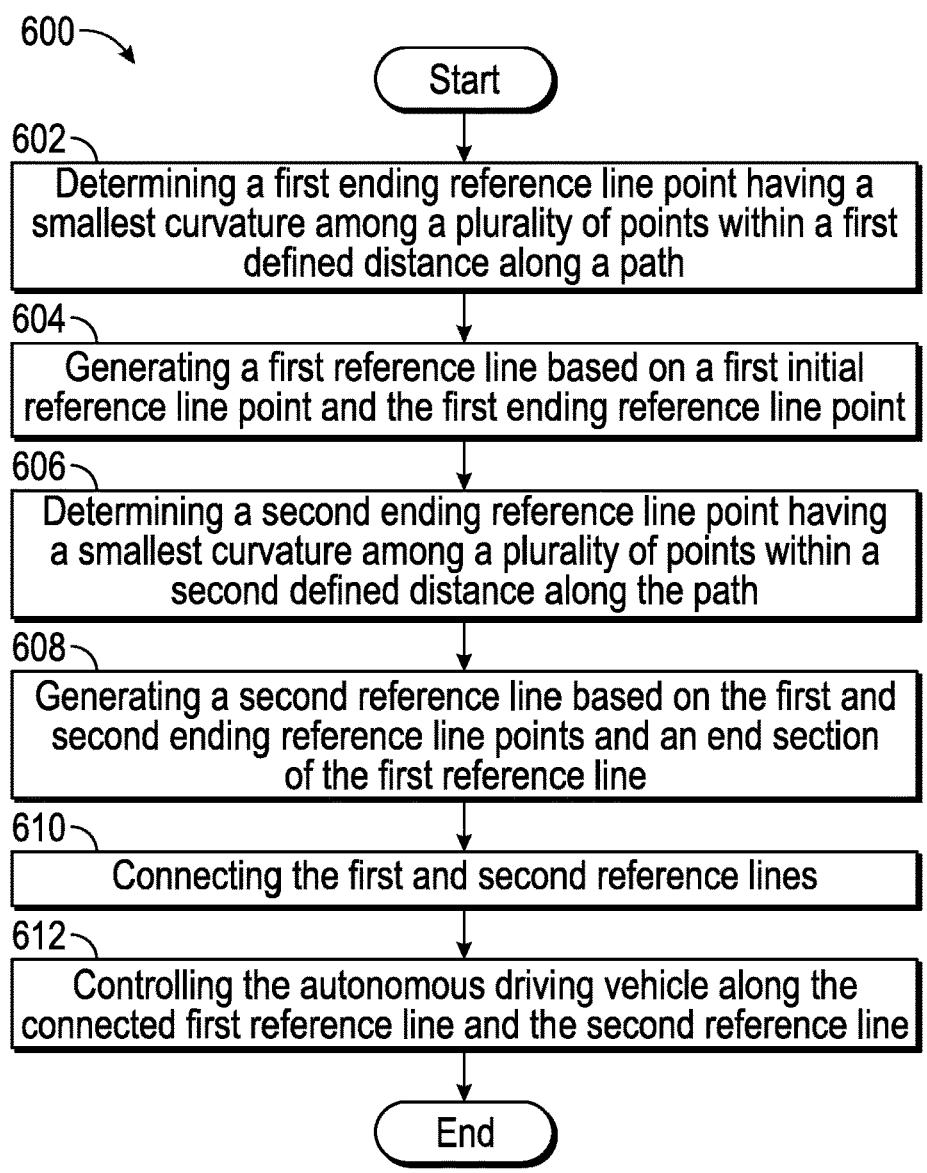
FIG. 6 is a flow diagram illustrating a process of generating a reference line for controlling an autonomous driving vehicle according to one embodiment.

FIG. 6 is a flow diagram illustrating a process of generating a reference line for controlling an autonomous driving vehicle according to one embodiment. Process 600 may be performed by processing logic which may include software, hardware, or a combination thereof. For example, process 600 may be performed in part by reference line generator 308. Referring to FIG. 6, process 600 includes in operation 602, determining a first ending reference point having a smallest curvature among a plurality of points within a first defined distance along a path, in operation 604, generating a first reference line based on a first initial reference point and the first ending reference point, and in operation 606, determining a second ending reference point having a smallest curvature among a plurality of points within a second defined distance along the path. Process 600 further includes in operation 608, generating a second reference line based on the first and second ending reference points and an end section of the first reference line, in operation 610, connecting the first and second reference lines and in operation 612, controlling the autonomous driving vehicle along the connected first reference line and the second reference line.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
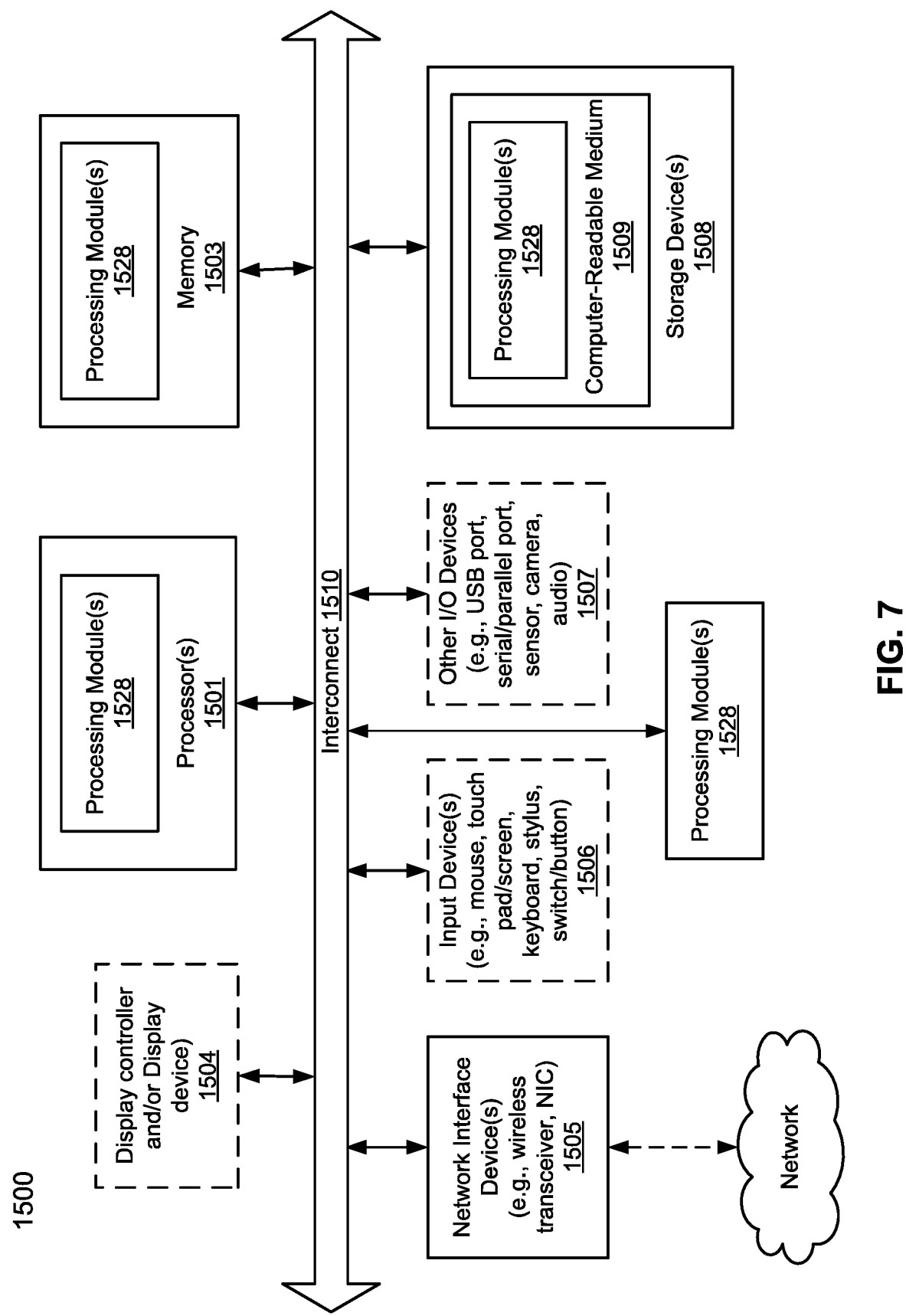
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110, reference line generator 308 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable medium, machine-readable storage medium or a computer-readable medium, all of which may be non-transitory) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, reference line generator 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a reference line for operating an autonomous driving vehicle, the method comprising:
    determining a first ending reference point having a smallest curvature among a plurality of reference points within a first defined distance along a first segment of a path, wherein the first segment of the path has a starting point and a first ending point, wherein the first defined distance has the first ending point of the first segment of the path as a middle point;
    generating a first reference line based on the starting point and the first ending reference point;
    determining a second ending reference point having a smallest curvature among a plurality of reference points within a second defined distance along a second segment of the path, wherein the second segment extends from the starting point to a second ending point, and is longer than the first segment, wherein the second defined distance has the second ending point as a middle point;
    generating a second reference line based on the first ending reference point, the second ending reference point, and an end section of the first reference line; and
    controlling the autonomous driving vehicle along the first reference line and the second reference line.

2. The method of claim 1, wherein the plurality of points within the first defined distance along the path are obtained from a map, the method further comprising:
    checking a curvature of each of the plurality of reference points within the first defined distance to determine the first ending reference point having the smallest curvature.

3. The method of claim 1, wherein the first defined distance is obtained by:
    obtaining an initial length of the first segment of the path;
    subtracting and adding a predetermined distance from the initial length of the reference line to determine the first defined distance along the path.

4. The method of claim 3, wherein the predetermined distance is about 10 percent of the initial length of the first segment of the path.

5. The method of claim 1, wherein the end section of the first reference line is less than 10 percent of a length of the first reference line.

6. The method of claim 1, wherein generating a second reference line based on the first and second ending reference points and an end section of the first reference line comprises using a first set of constraints for the end section of the first reference line, the first set of constraints comprising (x, y) coordinates and heading of the autonomous driving vehicle.

7. The method of claim 6, wherein a second set of constraints are used for generating the second reference line, the second set of constraints comprising (x, y) coordinates and heading of the autonomous driving vehicle, wherein the second set of constraints is less stringent than the first set of constraints.

8. A non-transitory machine-readable medium having instructions stored therein, which when executed by a processor, cause the processor to perform operations for generating a reference line for operating an autonomous driving vehicle, the operations comprising:
    determining a first ending reference point having a smallest curvature among a plurality of reference points within a first defined distance along a first segment of a path, wherein the first segment of the path has a starting point and a first ending point, wherein the first defined distance has the first ending point of the first segment of the path as a middle point;
    generating a first reference line based on the starting point and the first ending reference point;
    determining a second ending reference point having a smallest curvature among a plurality of reference points within a second defined distance along a second segment of the path, wherein the second segment extends from the starting point to a second ending point, and is longer than the first segment, wherein the second defined distance has the second ending point as a middle point;
    generating a second reference line based on the first ending reference point, the second ending reference point, and an end section of the first reference line; and
    controlling the autonomous driving vehicle along the first reference line and the second reference line.

9. The machine-readable medium of claim 8, wherein the plurality of points within the first defined distance along the path are obtained from a map, the operations further comprising:
    checking a curvature of each of the plurality of reference points within the first defined distance to determine the first ending reference point having the smallest curvature.

10. The machine-readable medium of claim 8, wherein the first defined distance is obtained by:
    obtaining an initial length of the first segment of the path;
    subtracting and adding a predetermined distance from the initial length of the reference line to determine the first defined distance along the path.

11. The machine-readable medium of claim 10, wherein the predetermined distance is about 10 percent of the initial length of the first segment of the path.

12. The machine-readable medium of claim 8, wherein the end section of the first reference line is less than 10 percent of a length of the first reference line.

13. The machine-readable medium of claim 8, wherein generating a second reference line based on the first and second ending reference points and an end section of the first reference line comprises using a first set of constraints for the end section of the first reference line, the first set of constraints comprising (x, y) coordinates and heading of the autonomous driving vehicle.

14. The machine-readable medium of claim 13, wherein a second set of constraints are used for generating the second reference line, the second set of constraints comprising (x, y) coordinates and heading of the autonomous driving vehicle, wherein the second set of constraints is less stringent than the first set of constraints.

15. A data processing system comprising:
    a processor; and
    a memory coupled to the processor to store instructions, which when executed by the processor, cause the processor to perform operations for generating a reference line for operating an autonomous driving vehicle, the operations including:
        determining a first ending reference point having a smallest curvature among a plurality of reference points within a first defined distance along a first segment of a path, wherein the first segment of the path has a starting point and a first ending point, wherein the first defined distance has the first ending point of the first segment of the path as a middle point, generating a first reference line based on the starting point and the first ending reference point, determining a second ending reference point having a smallest curvature among a plurality of reference points within a second defined distance along a second segment of the path, wherein the second segment extends from the starting point to a second ending point, and is longer than the first segment, wherein the second defined distance has the second ending point as a middle point, generating a second reference line based on the first ending reference point, the second ending reference point, and an end section of the first reference line, and controlling the autonomous driving vehicle along the first reference line and the second reference line.

16. The system of claim 15, wherein the plurality of points within the first defined distance along the path are obtained from a map, the operations further comprising:

checking a curvature of each of the plurality of reference points within the first defined distance to determine the first ending reference point having the smallest curvature.

17. The system of claim 15, wherein the first defined distance is obtained by:

obtaining an initial length of the first segment of the path;

subtracting and adding a predetermined distance from the initial length of the reference line to determine the first defined distance along the path.

18. The system of claim 17, wherein the predetermined distance is about 10 percent of the initial length of the first segment of the path.

19. The system of claim 15, wherein the end section of the first reference line is less than 10 percent of a length of the first reference line.

20. The system of claim 15, wherein generating a second reference line based on the first and second ending reference points and an end section of the first reference line comprises using a first set of constraints for the end section of the first reference line, the first set of constraints comprising (x, y) coordinates and heading of the autonomous driving vehicle.

21. The system of claim 20, wherein a second set of constraints are used for generating the second reference line, the second set of constraints comprising (x, y) coordinates and heading of the autonomous driving vehicle, wherein the second set of constraints is less stringent than the first set of constraints.

* * * * *